United States Patent [19]

Hummel

[11] 4,126,270

[45] Nov. 21, 1978

[54] SOLAR ENERGY COLLECTION SYSTEM

[76] Inventor: Richard L. Hummel, 87 Boulton Dr., Toronto, Canada, M4V 2V5

[21] Appl. No.: 761,187

[22] Filed: Jan. 21, 1977

[30] Foreign Application Priority Data

Jan. 23, 1976 [GB] United Kingdom ................. 2595/76

[51] Int. Cl.² .............................................. F24J 3/02
[52] U.S. Cl. .................................... 237/1 A; 126/270
[58] Field of Search ............... 237/1 A; 126/270, 271, 126/400

[56] References Cited

U.S. PATENT DOCUMENTS

| | | | |
|---|---|---|---|
| 2,553,073 | 5/1971 | Barnett | 126/271 |
| 2,680,565 | 6/1951 | Lof | 237/1 A |
| 3,875,925 | 4/1975 | Johnston | 126/270 |
| 3,960,136 | 6/1976 | Moan et al. | 126/271 |
| 4,016,860 | 4/1977 | Moan | 126/270 |
| 4,029,258 | 6/1977 | Groth | 126/270 |
| 4,046,133 | 9/1977 | Cook | 126/270 |
| 4,050,443 | 9/1977 | Peck et al. | 237/1 A |

Primary Examiner—Henry C. Yuen
Attorney, Agent, or Firm—Rogers, Bereskin & Parr

[57] ABSTRACT

A solar energy collection system for a building is described. A solar energy collector is disposed at the exterior surface of the building and includes a solar energy absorbent body having a surface which is exposed to sunlight and from which solar energy can be transmitted as sensible heat. A panel which is transparent to sunlight is spaced from the said surface of the absorbent body so as to define therewith a passageway in which air contacts at least a substantial area of said surface so that air in said passageway absorbs heat transmitted from said surface when the collector is in use. The passageway has an inlet and an outlet and the absorbent body and panel are arranged with the outlet higher than the inlet so that heated air in the passageway tends to rise by convection towards the outlet. The building is provided with heating means including a circulation circuit for a heating fluid. Heat exchange means are coupled to said air passageway outlet of the solar energy collector for passage of heated air therethrough. The heat exchange means are also coupled to the circulation circuit of the building heating means and are arranged to permit heat transfer between said heated air and the heating fluid. A return air flow conduit is coupled between the heat exchange means and the inlet of the air passageway of the solar energy collector for returning heated air from the heat exchange means to the air passageway for recirculation.

6 Claims, 7 Drawing Figures

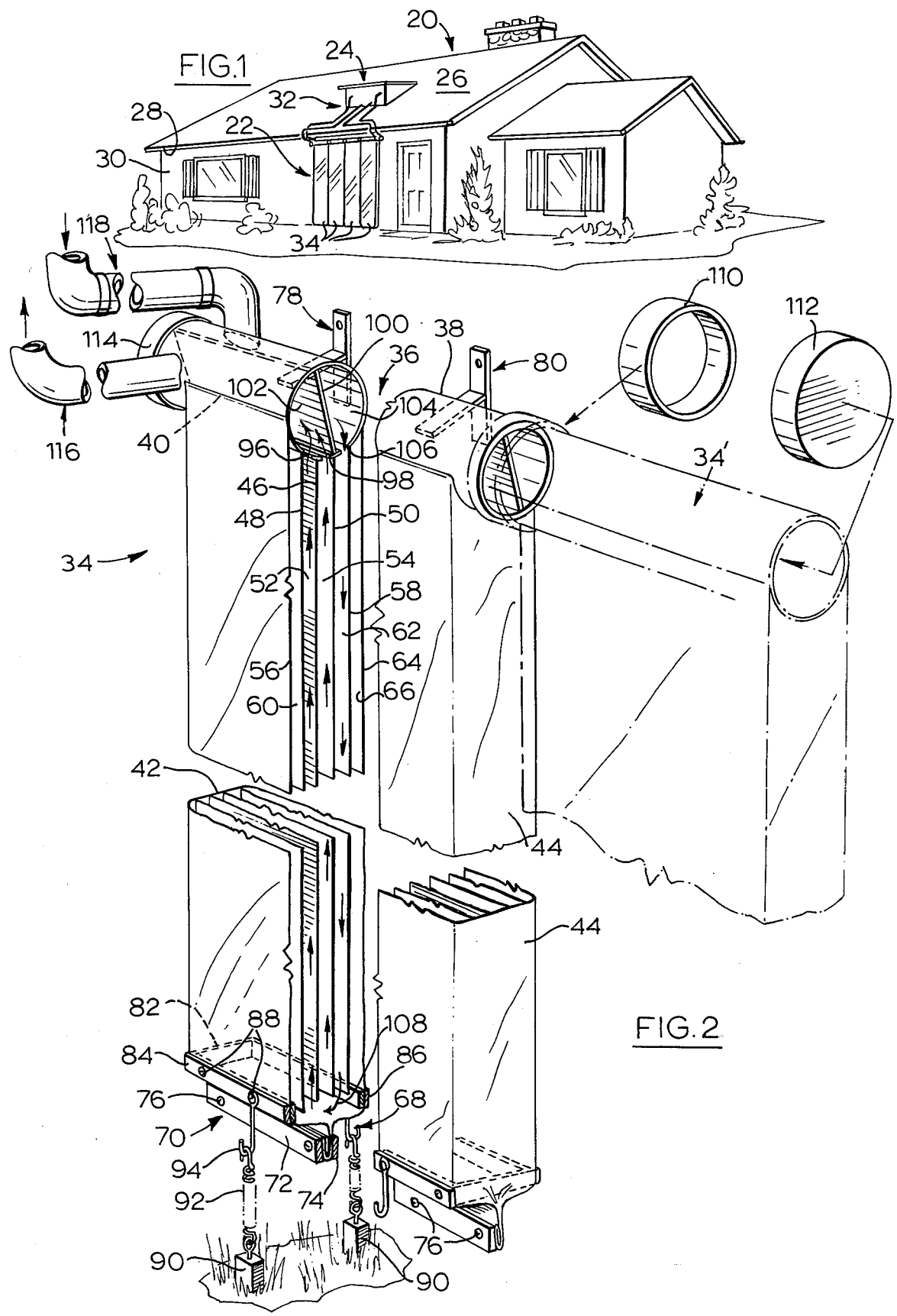

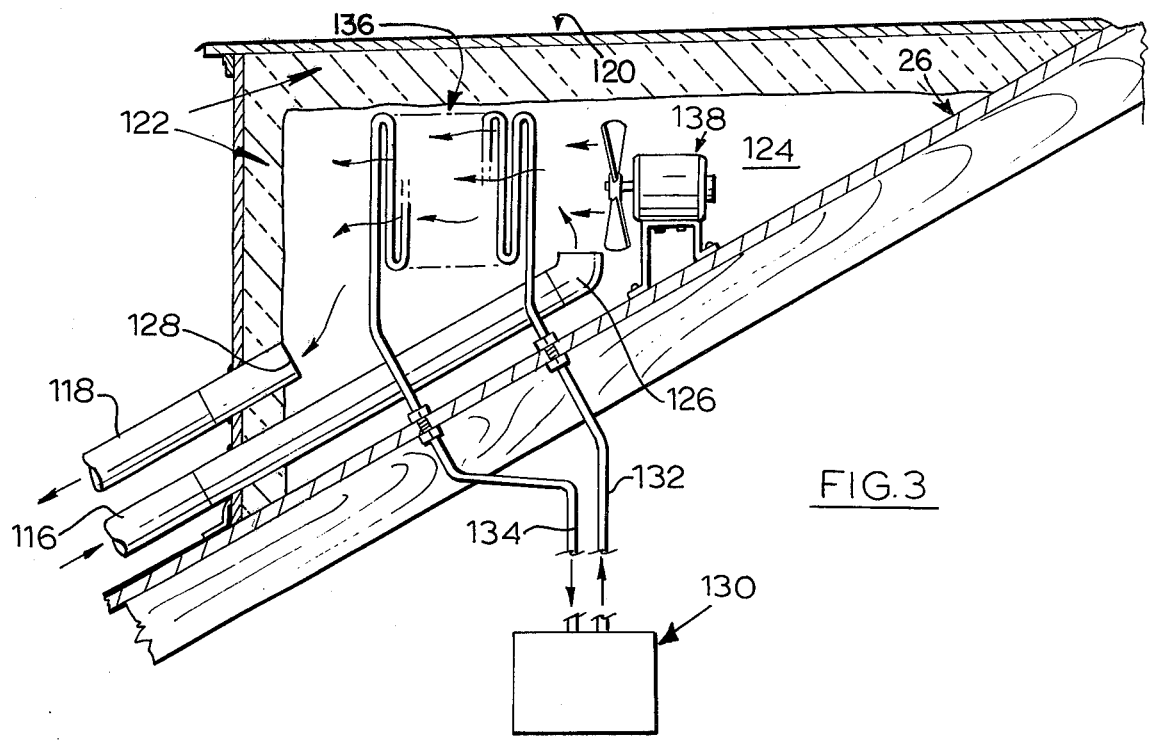
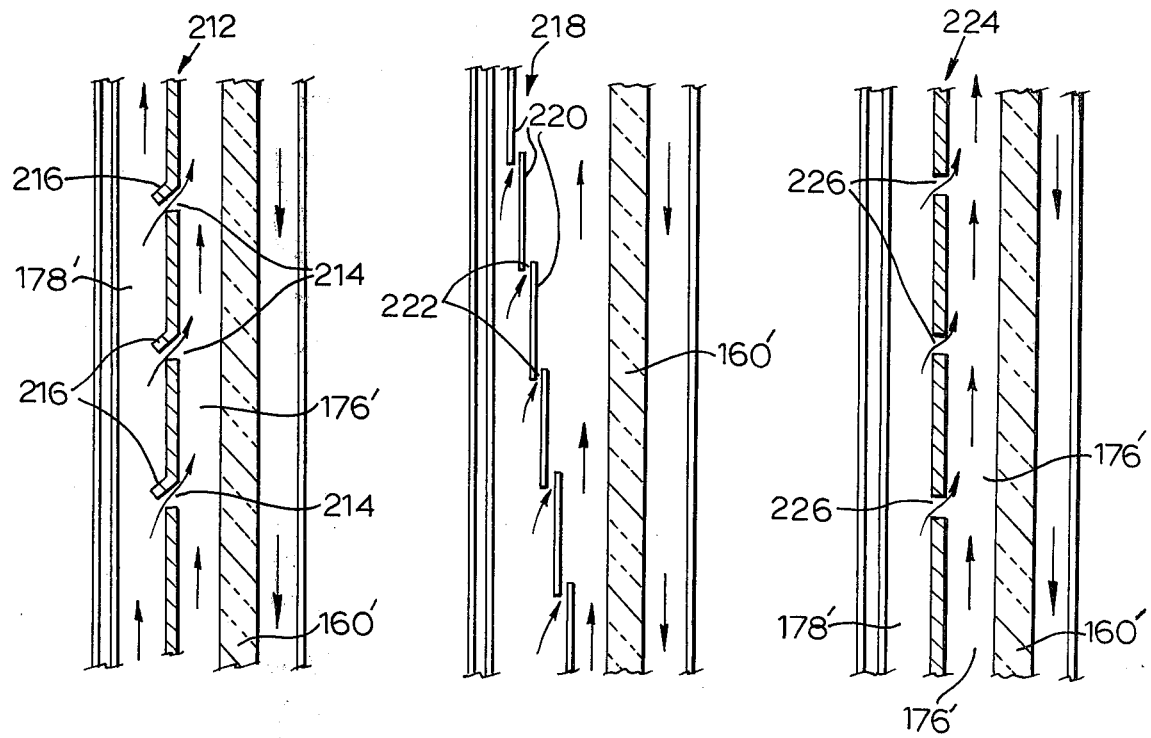

SOLAR ENERGY COLLECTION SYSTEM

This invention relates to solar energy collection systems for buildings.

Solar collection systems have previously been proposed in which water is pumped through solar panels exposed to sunlight. The panels have black inner surfaces which are heated by the sunlight and from which heat is transmitted to the water. The heated water leaving the panels may be stored or used directly, for example, for domestic heating. However, such systems have been relatively expensive, both in terms of the capital costs for the components and for their installation and in terms of the cost of operating the equipment required to pump the water through the solar panels. Since the water is exposed to ambient air, freezing of the water may also be a problem in low temperature environments. A further factor is that the solar panels have a relatively high heat capacity, with the result that a significant amount of heat is lost when the sun is obscured.

An object of the present invention is to provide an improved solar energy collection system for a building.

According to the invention, a solar energy collector is disposed at the exterior surface of the building and includes a solar energy absorbent body having a surface which is exposed to sunlight and from which solar energy can be transmitted as sensible heat. A panel which is transparent to sunlight is spaced from the said surface of the absorbent body so as to define therewith a passageway in which air contacts at least a substantial area of said surface so that air in said passageway absorbs heat transmitted from said surface when the collector is in use. The passageway has an inlet and an outlet and the absorbent body and panel are arranged with the outlet higher than the inlet so that heated air in the passageway tends to rise by convection towards the outlet. The building is provided with heating means including a circulation circuit for a heating fluid. Heat exchange means are coupled to said air passageway outlet of the solar energy collector for passage of heated air therethrough. The heat exchange means are also coupled to the circulation circuit of the building heating means and are arranged to permit heat transfer between said heated air and the heating fluid. A return air flow conduit is coupled between the heat exchange means and the inlet of the air passageway of the solar energy collector for returning heated air from the heat exchange means to the air passageway for recirculation.

In this connection, it is to be noted that the term "heating means" used in this application is intended to denote any form of heating load in the building and includes both space heating systems such as hot water radiator circuits and systems for storing heat. For example, it may be advantageous to transfer heat from the air in the solar energy collector to a fluid such as water in a storage tank. Water is a convenient storage medium because it has a relatively high heat capacity. Also, water is inexpensive and can be moved using minimal amounts of energy, for example, to a storage facility in the basement of a building.

In order that the invention may be more clearly understood, reference will now be made to the accompanying drawings which illustrate a number of embodiments of the invention by way of example. In the drawings:

FIG. 1 is a perspective view of a dwelling house having a solar energy collection system;

FIG. 2 is a perspective view, partly in section, of the solar energy collector used in the system of FIG. 1;

FIG. 3 is a vertical sectional view through the heat exchanger used in the sytem of FIG. 1;

Figure 4:
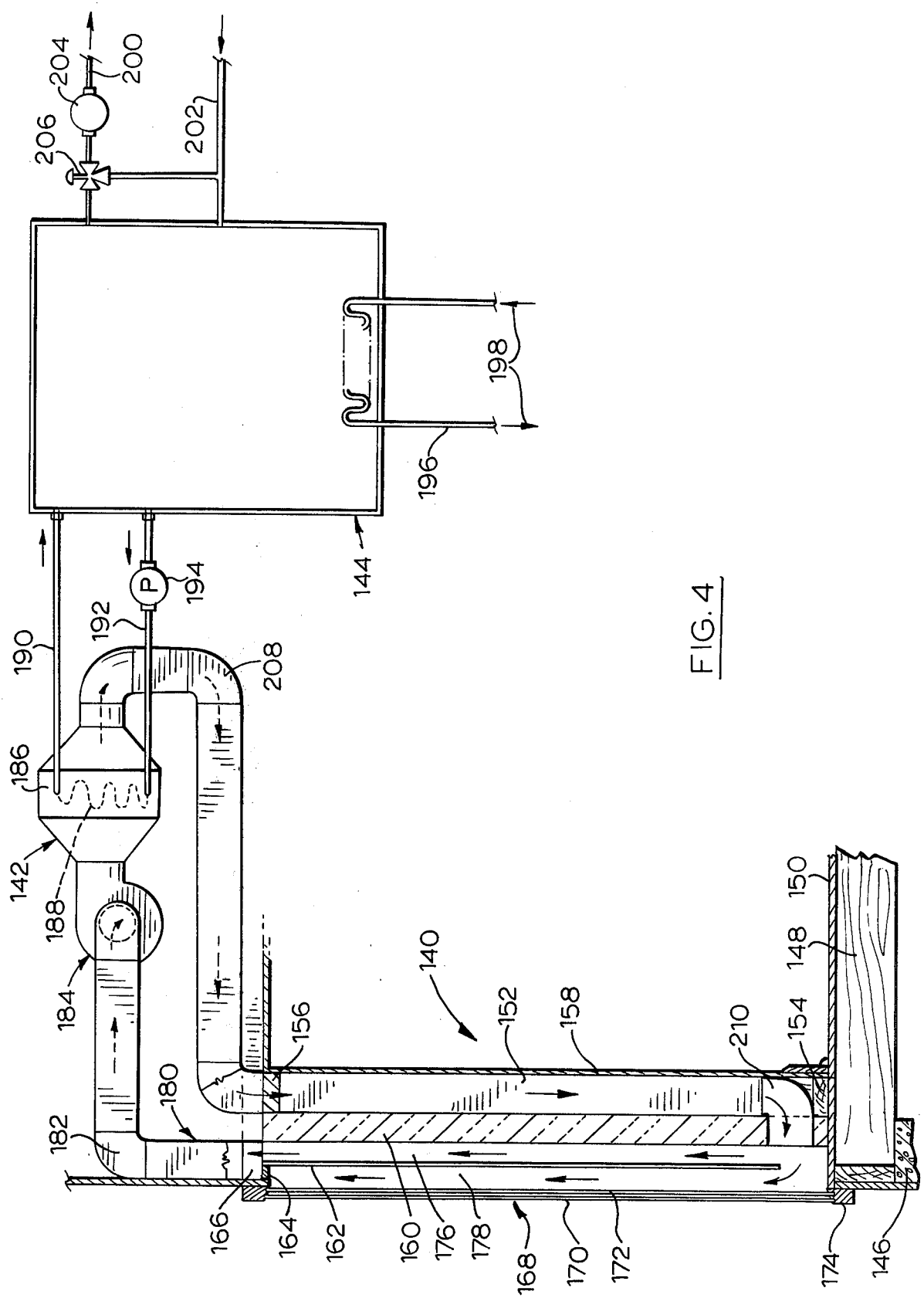
FIG. 4 is a diagrammatic illustration of a solar energy collection system according to a second embodiment of the invention; and, FIGS. 5, 6 and 7 are diagrammatic illustrations of three possible modifications of the system shown in FIG. 4.

Reference will first be made to FIG. 1 which shows a dwelling house, generally denoted 20, having a solar energy collection system including a solar energy collector indicated at 22 and a heat exchanger 24 mounted on the roof 26 of the house. The collector 22 is suspended below the eaves 28 of the house and hangs down the exterior surface of a wall 30. Preferably the wall 30 faces south (in the northern hemisphere) for maximum exposure to sunlight. The house has a conventional hot water radiator heating system which is coupled to the heat exchanger 24 as will be more specifically described later. The solar energy collector 22 is also coupled to the heat exchanger by ductwork generally indicated at 32.

In this embodiment, the collector 22 is of modular construction and comprises four individual units 34 disposed side by side on wall 30. Although four units have been shown, it is of course to be understood that the collector may be made up of any appropriate number of units. FIG. 2 is a perspective view showing the unit 34 which appears at the left in FIG. 1, and is sectioned at 36 to show internal structure. The adjacent unit is shown in chain line at 34' in FIG. 2. The unit shown in full lines in FIG. 2 will now be described as representative of any one of the units.

Unit 34 includes a section 38 of insulated plastic pipe from which a plurality of thin and flexible plastic panels are suspended. In this case, six panels depend from pipe section 38 longitudinally thereof. The panels are disposed in spaced parallel positions and are secured to pipe section 38 along their upper margins by a conventional solvent adhesive as indicated at 40 in the case of the outer panel. End panels 42 and 44 are provided at respectively opposite ends of the unit and the six longitudinally extending panels are sealed to the end panels at their end edges. The upper margins of the end panels 42 and 44 are also sealed to the pipe section 38.

In FIG. 2, sunlight is incident on unit 34 from the left. The third panel viewed from the left and denoted 46 forms the solar energy absorbent body of collector unit 34. This panel is coloured black and is indicated by a somewhat darker line than the other panels, although it need not necessarily be thicker than the other panels. The panels on respectively opposite sides of panel 46 are denoted respectively 48 and 50 and define with panel 46 heated air passageways 52 and 54 respectively. Spaced outwardly from panels 48 and 50 are two further panels 56 and 58 respectively. Panel 56 is the front panel of the unit and defines with panel 48 an air space 60 which is closed at its upper end and which serves as insulation against heat loss from passageway 52. Panels 50 and 58 together define a passageway 62 along which air is returned from the heat exchanger 24 to the passageways 52 and 54 as will be described. The last panel is denoted 64 and forms the rear panel of the unit. Together with panel 58, panel 64 defines an insulating air space 66 which essentially performs the same function as air space 60 but at the inner side of the unit 34.

The front and rear panels 56 and 64 respectively and the end panels 42 and 44 are somewhat longer than the internal panels and are folded together as indicated at 68 to close the bottom end of the unit. The intention is that the units 34 will be sold as part of "retrofit" kits for existing buildings and that the units will be made available with panels of standard lengths. The purchaser will trim the internal panels generally to the same length according to the height of the wall to which the unit is to be fitted. The excess portions at the lower ends of the exterior panels of the unit will then be rolled up as indicated at 68 and fitted with a clamp 70. In this embodiment, clamp 70 is made up of two bars 72 and 74 secured together by screw 76 passing through the panels.

The unit is suspended from the pipe section 38 by way of brackets 78 and 80 secured to the house wall. At its lower end, the "bag" formed by the front and rear panels 56 and 64 and the end panels 42 and 44 is kept open by an internal metal frame 82 held in place by front and rear clamping bars 84 and 86 secured to the frame by screws indicated at 88 passing through the relevant panels. The holes made by the screws in the panels allow some leakage of air into and from the unit to compensate for changes in the volume of the air inside the unit as it is heated and cools. As an alternative to or in addition to these holes, leakage openings may be deliberately provided in the outer panels for this purpose. In any event, in the illustrated embodiment, the lower end of the unit is held in place by pegs 90 driven into the ground and connected by springs 92 to hooks 94 held in place by the screws 88 referred to above.

In use, solar energy is absorbed by the black panel 46 of unit 34. This energy is transmitted as sensible heat to the air in the passageways 52 and 54 on opposite sides of the panel 46. The air in passageway 52 also receives heat directly due to the "greenhouse effect" of panels 48 and 56. As the air in passageways 52 and 54 is heated, it rises by natural convection as indicated by arrows in FIG. 2. Pipe section 38 is formed with longitudinal slots 96 and 98 which communicate with passageways 52 and 54 respectively and through which this heated air passes into the pipe section. A transverse partition 100 in pipe section 38 divides the section into a heated air chamber 102, into which slots 96 and 98 open, and a return air chamber 104. A further slot 106 in the pipe section provides communication between chamber 104 and the return air passageways 62 defined between panels 50 and 58 of unit 34. Chamber 104 receives air returning from the heat exchanger 24 as will be described and allows this air to pass into passageway 62. It will be noted that the lower ends of the internal panels of unit 34 are free and terminate slightly short of the bottom of the unit. Accordingly, this return air can flow from passageway 62 into the heated air passageways 52 and 54 as indicated by the arrows 108 in FIG. 2. It will be appreciated that the air in the outer air spaces 60 and 66 is essentially static and that, although these spaces communicate with the inner passageways, there will in fact be no air flow between the air spaces and the passageways.

As indicated above, the solar energy collector units 34 are modular and the number of units used will depend on the required overall size of the solar energy collector. In this embodiment, each unit is of the following approximate dimensions: height — 20 feet; width — 3 feet; depth — 8 inches. The units are disposed side-by-side and are fitted together by way of their pipe sections 38. The air chambers 102 and 104 of the sections co-operate to define common heated air and return air ducts extending along the top of the collector. There is no communication between the air passageways of adjacent units other than by way of the pipe sections.

As can be seen from FIG. 2, the pipe sections 38 of adjacent units are butted together end to end. A collar 110 is fitted around the joint and secured air-tightly to both pipe sections by a conventional solvent adhesive. The appropriate number of sections are assembled in this way and the outer ends of the two endmost sections are fitted with a closure cap which is also secured by solvent adhesive. A cap to be fitted to the right hand end of the collector in FIG. 2 is indicated at 112 and part of a similar cap 114 is visible at the left hand end of the collector.

As discussed above, the pipe sections, when assembled in this way, co-operate to define air ducts extending along the top of the solar energy collector. The duct formed by the chambers 102 of the pipe sections carries outgoing heated air to the heat exchanger 24, while the duct formed by the chamber 104 carries return air. Ducts formed by insulated plastic pipe are provided adjacent respectively opposite ends of the collector unit for carrying the heated air to and the return air from the heat exchanger 24. This ductwork is generally indicated at 32 in FIG. 1. Part of two ducts for the left hand end of the solar energy collector is visible in FIG. 2. Similar ducts are provided at the opposite end of the collector but have not been shown in this view. The ductwork is assembled from insulated plastic pipes and elbows secured together and to the relevant pipe section 38 by solvent adhesive. The pipes carrying the heated air from the collector to the heat exchanger 24 are indicated at 116 and the return pipes at 118. It will be noted that the pipes initially extend outwardly and then upwardly to clear the eaves of the building. Appropriate retaining brackets will be provided for securing the ductwork if appropriate, although for simplicity of illustration, they have not been shown in the drawings.

Reference will now be made to FIG. 3 in describing the heat exchanger 24. The heat exchanger is formed by a weatherproof and airtight enclosure 120 which is built onto the roof 26 of the house. The enclosure is heavily insulated to minimize heat loss to the ambient air as indicated at 122.

Part of the ductwork 32 coupling the heat exchanger and the solar energy collector is visible in FIG. 3. The pipe carrying heated air from the collector to the heat exchanger is denoted 116 and the return pipe is denoted 118 (in correspondence with FIG. 2). Pipe 116 extends into the space 124 defined by enclosure 120 and terminates in an outlet fitting 126 from which heated air flows generally upwardly as indicated. In contrast, the return air pipe 118 terminates at 128, just inside the air space.

Heat exchanger 24 is also coupled to the hot water heating system of the house 20. The system is indicated diagrammatically at 130 in FIG. 3 and includes flow and return pipes 132 and 134 which are taken up into the roof of the building and coupled to a heat exchange coil 136 inside enclosure 120. Accordingly, hot water for the heating system 130 flows through coil 136. It will be seen that the coil is positioned adjacent the heated air outlet 126 in enclosure 120. A fan 138 is located in front of coil 136 on the opposite side of outlet 126 so as to blow the heated air over the coils. Accordingly, assuming the air is at a higher temperature than the water in the coil 136, heat will be transferred from the air to the water and can be used in the heating system 130.

When the solar energy collector 22 is exposed to sunlight, solar radiation heats the solar energy absorbent panel 46 in each of the units 34 of the collector and the heater air rises by natural convection and enters the heated air chamber 102 of the relevant pipe section 38 at the top of the unit as described above. From there, the heated air passes into the nearest heated air outlet pipe 116 and up to the heat exchanger 28, all by natural convection. The upward movement of heated air in the passageways 52 and 54 in turn draws air downwardly in the return air passageway 62 of each of the collector units 34. This air flow draws air from the return air chamber 104 of the relevant pipe section 38 and, through the pipes 118 from the internal air space of heat exchanger enclosure 120. Accordingly, air recirculates through the solar energy collector units 34 and heat exchanger enclosure 120. Heat is removed from the air in enclosure 120 by the water flowing through the coil 136 (assuming the air is at a higher temperature than the water) and the cooled air returns to the collector for reheating. Thermostatic controls (not shown) may be provided to ensure that water flows through coil 136 only when the air temperature is higher than that of the water.

A primary advantage of this system is that the circulation of air occurs by natural convection and does not require blower assistance. The fan 138 in the heat exchanger serves merely to blow the heated air over the coil 136 and has negligible effect on the main air circulation. A further advantage of the system is that there is minimal heat loss when the sun is obscured and solar energy is no longer collected. When this happens and the air inside heat exchanger 24 begins to cool, heat will retransfer from the water in coil 136 to the air in the heat exchanger when the temperature of the air falls below that of the water. The circulation of air in the system will stop and the heated air will remain in the enclosure 120 of the heat exchanger. When sunlight again begins to fall on the collector, air circulation will be re-established and the heated air in enclosure 120 will transfer back to the water when the temperature of the air rises above that of the water.

The solar energy collection system described with reference to FIGS. 1 to 3 is primarily designed as a "retrofit" system; that is, a system to be installed on existing buildings. The equipment used in the system will be made available in the form of a kit. The installer will buy a number of collector units appropriate to the wall area to be covered and will assemble the units and trim the plastic panels to size as described above.

FIG. 4 is a diagrammatic illustration of a "built-in" type of solar energy collector system which might be incorporated in a new house during construction. The drawing shows a vertical sectional view through part of the wall 140 of the house. A heat exchanger is indicated at 142 and the water storage tank at 144.

Part of the basement wall of the house is visible at 146 and supports floor joists 148 and a floor covering 150 in conventional fashion. Wall framing comprising vertical studs 152 extending between plates 154 and headers 156 is supported on the joists. Drywall is applied to the inner faces of the joists as indicated at 158. A layer 160 of insulation is applied externally of the wall framing.

Spaced outwardly from the insulation 160 is a solar energy absorbent body formed by a sheet 162 of aluminum foil suspended from a support 164 which extends longitudinally of the wall and which is itself attached to cross members, one of which is indicated at 166, spaced along the wall. In this embodiment, the foil sheet 162 is of twenty gauge thickness and its external surface is painted a selective black. Spaced outwardly of the foil sheet 162 is a double glazed glass panel comprising spaced parallel sheets of glass 170 and 172 in a frame 174.

As a result of this construction, two vertical air passageways 176 and 178 are provided on respectively opposite sides of the aluminum foil sheet 162. As in the previous embodiment, solar radiation incident upon the wall 140 is absorbed by the solar energy absorbent body 162 and is transmitted as sensible heat to the air in the passageways 176 and 178. The "greenhouse effect" will also contribute to heating the air in the outer passageway 178. In any event, this heated air will then tend to rise by natural convection as indicated by the arrows in the passageways.

At their upper ends, the passageways 176 and 178 enter a collection header 180 which merges into a hot air duct 182 similar to the type of duct used for conventional forced air heating systems. Duct 182 communicates with a blower 184, the outlet of which is coupled to the heat exchanger 142. Heat exchanger 142 is formed by an enclosure 186 defining an internal air space in which a hot water coil 188 is fitted. Coil 188 is coupled to the hot water storage tank 144 referred to above by flow and return lines 190 and 192. A pump 194 is provided in line 192 for circulating water from the tank through coil 188. A so-called "extender coil" 196 is provided in tank 144 and is coupled to the domestic hot water system of the house as indicated by arrows 198. Tank 144 also communicates directly with a domestic radiator-type heating system of the house by way of flow and return lines 200 and 202 respectively. A pump 204 circulates water in the radiator system. A diverting valve 206 controls the heating system.

Referring back to the heat exchanger 142, air leaving enclosure 186 enters a return air duct 208 which communicates with the air space between two adjacent studs 152 in the framing of wall 140. The header 156 of the wall framing is apertured to permit air to pass therethrough. The air space between the studs defines a return air passageway and communicates at its lower end with an elbow 210 inserted through the insulation 160 of wall 140. The elbow in turn communicates with the two air passageways 176 and 178 adjacent the aluminum foil sheet 162.

The system shown in FIG. 4 operates in essentially similar fashion to the system described with reference to FIGS. 1 to 3, except in that the air circulation is fan assisted. However, it is to be noted that the primary purpose of the fan to to ensure intimate contact between the incoming heated air and the hot water coil 188 rather than to actually effect circulation of the air in the system. Circulation would in fact occur naturally as a result of convection currents in the absence of fan 184.

FIGS. 5, 6 and 7 show alternative forms of solar energy collectors which may be used in the system of FIG. 4. Each of these views shows a part of a wall of the type shown in FIG. 4 but in which the solar energy absorbent body is of slightly different form. Primed reference numerals have been used in FIGS. 5, 6 and 7 to denote parts which correspond with parts of FIG. 4.

In all of these embodiments, the solar energy absorbent body has been designed with the "boundary layer effect" in mind. Thus, it is known that air adjacent the solar energy absorbent body of the collector will initially rise as a laminar boundary layer hugging the heated surface and flowing smoothly. As the air continues to rise, however, it becomes turbulent and mixes with the surrounding air. Referring back to the embodiment of FIG. 4, this turbulence and mixing of the heated air will tend to transmit heat to the double glazed glass panel 168 and the system will lose heat. While this heat loss may be acceptable in some practical applications, the solar energy absorbent bodies shown in FIGS. 5, 6 and 7 have been designed to minimize this loss.

Referring first to FIG. 5, the wall structure shown in that view incorporates a solar energy absorbent panel 212 formed with a plurality of transverse slots 214, the upper edge of each of which is defined by a forwardly directed flange 216 which defines an air scoop. These scoops deflect from the front air passageway 178' to the rear air passageway 176' the boundary layers of air adhering to the outer face of the body 212. The scoops are spaced vertically such that a rising boundary layer of air forming below each scoop will be deflected into the rear air passageway 176 before it becomes turbulent. In a typical installation, the slots 214 would be arranged at approximately one foot vertical spacings from one another. It will be appreciated that turbulence in the rear air passageway 176' is desirable to improve the heat transfer. The presence of the insulation 160' prevents significant heat loss from the system.

FIG. 6 shows a heat energy absorbent body 218 formed by a series of flat vertical plates 220 arranged in an ascending sequence with each plate above the lower plate spaced slightly further from the insulation 160' than the plate below and with its bottom margin overlapping the upper margin of the lower plate so as to define horizontal slots similar to the slots 214 of FIG. 5. These slots have the same effect as the slots 214 is directing into the rear air passageway 176' boundary layers of air forming on the outer surfaces of the plates 220.

Finally, FIG. 7 shows an arrangement which employs a solar energy absorbent body 224 in the form of a flat plate formed with vertically spaced horizontal slots 226. This form of body can be used where the volume of air flowing in the rear passageway 176' is greater than the volume of air flowing the front passageway 178' and if the slots 226 are dimensioned appropriately to cause the boundary layer to transfer from the front passageway to the rear passageway. If the pressures are the same at the base of the collector, the increasing buoyancy of the air in the rear passageway 176' will lead to a reduction in the pressure of the air in that passageway and will tend to cause air to transfer from the front passageway to the rear passageway. The motion of the air in the rear passageway can be periodically accelerated to reduce its pressure by Bernoulli's principle.

It should finally be noted that, while the preceding description relates to specific embodiments, many modifications are possible within the broad scope of the invention. For example, while the heat energy collection system shown in FIGS. 1 to 3 of the drawings relies on convection currents to provide air circulation, the circulation could be fan assisted. Conversely, the fan could be emitted from the FIG. 4 embodiment. Particularly where the heat exchanger is positioned lower than the top of the solar energy collector, it may be necessary to provide for fan assistance in order to establish an air circulation.

In the embodiments described, the solar energy collector is arranged vertically, although it is to be understood that this is not essential. The collector could be inclined provided the air can still rise by convection.

In the illustrated embodiments, air passageways are provided on both sides of the solar energy absorbent body. In an alternative embodiment, a single air passageway may be provided at the side of the body which is exposed to sunlight. Also, the described insulating air passageways could be omitted.

It is also to be noted that structural details of the system may vary from those shown in the drawings. For example, in the embodiment of FIGS. 1 to 3, it is not essential that the panels of the heat energy collector units be suspended from pipe sections. The units could be essentially in the form of large plastic bags suspended directly from the building. Also, the units could be manufactured with their lower ends closed instead of employing the arrangement shown in FIG. 2 in which the plastic panels are cut to size and clamped. The panels need not even necessarily be flexible.

According to a further embodiment of the invention, the surface of the solar energy absorbent body which is exposed to sunlight may be coated with an organic compound containing from twelve to twenty-five, preferably twenty benzine rings in a straight chain. This material absorbs ultra-violet rays, visible rays (4,000–7,000 A) and infrared rays to two microns and emits only a small proportion of all the rays received. In any event, for maximum absorption, the exposed surface of the solar energy absorbent body is preferably black in colour. However, for aesthetic or decorative purposes, dark colours such as maroon or dark blue can be used without excessive loss of efficiency. It would even be possible to provide a collector having transparent outer panels and a partially transparent solar energy absorbent body so that the collector can be used over windows in a house. Obviously, an arrangement such as this would not be as efficient as a collector having a black body. However, the arrangement would allow solar energy to be collected at areas of the house (windows) which would otherwise in fact be sources of heat loss from the house.

What I claim is:

1. For use in a solar energy collection system, a solar energy collector unit which is of modular form and is adapted to be coupled to a similar unit to form a composite solar energy collector, the unit comprising a plurality of flexible plastic panels which are adapted to be suspended in upright positions at the exterior of a building, said panels comprising: a first panel which is adapted to absorb solar energy and which constitutes a solar energy absorbent body of the unit, said panel having front and rear surfaces from both of which solar energy absorbed by the body can be transmitted as sensible heat; second and third panels spaced outwardly from the respective front and rear surfaces of the first panel so as to in use define with said first panel passageways in which air can absorb heat transmitted from said body; a fourth panel spaced from said third panel to in use define therewith a passageway forming a return air conduit of the unit and communicating adjacent the lower end of the latter with said passageways for heated air; and two end panels disposed at respectively opposite ends of the unit generally transversely with respect to the first mentioned panels and coupled thereto to define sealed ends for said passageways; said second and fourth panels and end panels being adapted to be connected together adjacent the bottom of the unit to define a closed lower end thereof; and at least those panels intended to be disposed in front of the solar energy absorbent body when the unit is in use being transparent to sunlight.

2. For use in a solar energy collection system, a solar energy collector unit which is of modular form and is adapted to be coupled to a similar unit to form a composite solar energy collector, the unit comprising a plurality of flexible plastic panels which are adapted to be suspended in upright positions at the exterior of a building, said panels comprising: a first panel which is adapted to absorb solar energy and which constitutes a solar energy absorbent body of the unit, said panel having front and rear surfaces from both of which solar energy absorbed by the body can be transmitted as sensible heat; second and third panels spaced outwardly from the respective front and rear surfaces of the first panel so as to in use define with said first panel passageways in which air can absorb heat transmitted from said body; a fourth panel spaced from said third panel to in use define therewith a passageway forming a return air conduit of the unit and communicating adjacent the lower end of the latter with said passageways for heated air; fifth and sixth panels defining respectively the front and rear surfaces of the unit and spaced outwardly from said second and fourth panels respectively to form therewith in use, insulating air spaces at the exterior of the unit; and two end panels disposed at respectively opposite ends of the unit generally transversely with respect to the first mentioned panels and coupled thereto to define sealed ends for said passageways; said fifth and sixth panels and end panels being adapted to be connected together adjacent the bottom of the unit to define a closed lower end thereof; and at least those panels intended to be disposed in front of the solar energy absorbent body when the unit is in use being transparent to sunlight.

3. A solar energy collection system for a building, the system comprising:

a solar energy collector disposed at the exterior of the building, said collector being of modular form and comprising an assemblage of individual collector units coupled together side-by-side, each said solar energy collector unit including a plurality of flexible plastic panels suspended in upright positions at the exterior of the building and comprising: a first panel which is adapted to absorb solar energy and which constitutes a solar energy absorbent body, said panel having front and rear surfaces from both of which solar energy absorbed by the body can be transmitted as sensible heat; second and third panels spaced outwardly from the respective front and rear surfaces of the first panel and defining therewith passageways in which air can absorb heat transmitted from said solar energy absorbent body, said passageways communicating with an inlet and an outlet, said outlet being higher than the inlet so that heated air in said passageways tends to rise by convection towards said outlet; a fourth panel disposed at the inner side of the unit and spaced from said third panel to form a passageway defining a return air flow conduit and communicating adjacent the lower end of the unit with the inlet of said heated air passageways; fifth and sixth panels defining respectively the front and rear surfaces of the unit and spaced outwardly from said second and fourth panels respectively to form insulating air spaces at the exterior of the unit; and two end panels disposed at respectively opposite ends of the unit generally transversely with respect to the first mentioned panels and coupled thereto to define sealed ends for said passageways; said fifth and sixth panels and end panels co-operating adjacent the bottom of the unit to define a closed lower end thereof; and at least those panels in front of said solar energy absorbent body being transparent to sunlight;

heating means in said building including a circulation circuit for a heating fluid; and, heat exchange means coupled to said air passageway outlets and to said return air flow conduits of the solar energy collector units and to the circulation circuit of the building heating means and arranged to permit heat transfer between said heated air and said heating fluid.

4. A system as claimed in claim 3, wherein each of said solar energy collector units further comprises a pipe section which extends longitudinally of the unit at the upper end thereof and from which said panels are suspended, said section itself being attached to the building; and wherein the section defines internal heated and return air chambers communicating respectively with the heated air and return air passageways of the unit; the pipe sections of adjacent units being coupled together end to end to form said assemblage of units in which said heated and return air chambers of the sections communicate with one another to define heated and return air ducts of the collector; the system further comprising ductwork coupled between said heated and return air ducts of the pipe sections and said heat exchange means.

5. A system as claimed in claim 3, wherein the heating fluid in said heating means is water, and wherein said heat exchange means comprises: an enclosure communicating with said air passageway of the solar energy collector and with said return air flow conduit so that heated air from the collector circulates through the enclosure; a water coil disposed in said enclosure and coupled in said circulation circuit of the heating means so that the water in the heating means is circulated through said coil; and blower means for blowing the heated air in said enclosure over said coil.

6. A system as claimed in claim 5, wherein said enclosure of the heat exchange means is built onto a roof surface of the building and is heavily insulated against heat loss to the atmosphere, and wherein the system further comprises insulated ductwork coupling said enclosure with said solar energy collector.

* * * * *